US005192855A

United States Patent [19]

Insulander et al.

[11] Patent Number: 5,192,855

[45] Date of Patent: Mar. 9, 1993

[54] IMPROVEMENTS IN CASH PAYMENT MACHINES ENABLING ACCEPTANCE OF CREDIT CARD PAYMENT

[75] Inventors: Björn Insulander; Torbernt Hjelmvik, both of Järfälla, Sweden

[73] Assignee: Modul-Elektronik AB, Järfälla, Sweden

[21] Appl. No.: 622,520

[22] Filed: Dec. 5, 1990

[30] Foreign Application Priority Data

Dec. 6, 1989 [SE] Sweden .............................. 8904126

[51] Int. Cl.[5] ......................... G06F 7/08; G06K 5/00

[52] U.S. Cl. .................................. 235/381; 235/380; 235/383

[58] Field of Search ............... 235/380, 383, 384, 381, 235/375

[56] References Cited

U.S. PATENT DOCUMENTS

| | | | |
|---|---|---|---|
| 4,415,065 | 11/1983 | Sandstedt | 235/383 |
| 4,700,055 | 10/1989 | Kashkashian et al. | 235/380 |
| 4,778,983 | 10/1988 | Ushikubo | 235/381 |
| 4,795,892 | 1/1989 | Gilmore et al. | 235/381 |
| 4,829,165 | 5/1989 | Kalawsky | 235/375 |
| 4,900,905 | 2/1990 | Pusic | 235/381 |
| 4,977,502 | 12/1990 | Baker et al. | 235/384 |
| 4,982,070 | 1/1991 | Bezin et al. | 235/384 |

*Primary Examiner*—Eugene R. LaRoche
*Assistant Examiner*—Christopher R. Glembocki
*Attorney, Agent, or Firm*—Nies, Kurz, Bergert & Tamburro

[57] ABSTRACT

An arrangement in pay machines of the kind which include a coin or banknote verifier, a first computer unit which functions to activate an intermediate cash till or the like which is intended to guide coins or banknotes to a final cash till or to a coin cup from which the coins or banknotes can be recovered, and which also functions, subsequent to payment having been accepted, to activate devices for delivering the goods or the service for which payment has been made. The invention is characterized in that the arrangement includes a second computer unit (17) which is connected between the coin or banknote verifier (1) and the first computer unit (4); in that the second computer unit (17) is intended to detect a control signal or the like delivered by the first computer unit (4) to a device (5, 6) which functions to control the intermediate cash till and the final cash till; in that the second computer unit (17) has connected thereto a credit card reader (26) and one or more buttons (27, 28) which, when depressed, deliver to the second computer unit (17) a signal which corresponds to a given sum of money; and in that, when payment is made by credit card and the button or buttons (27, 28) are depressed and payment of a given sum has been accepted, the second computer unit (17) functions to deliver to the first computer unit (4) a signal which corresponds to receipt of the coin or banknote verifier (1) of one or more accepted coins constituting the sum required.

8 Claims, 1 Drawing Sheet

IMPROVEMENTS IN CASH PAYMENT MACHINES ENABLING ACCEPTANCE OF CREDIT CARD PAYMENT

Figure 1:
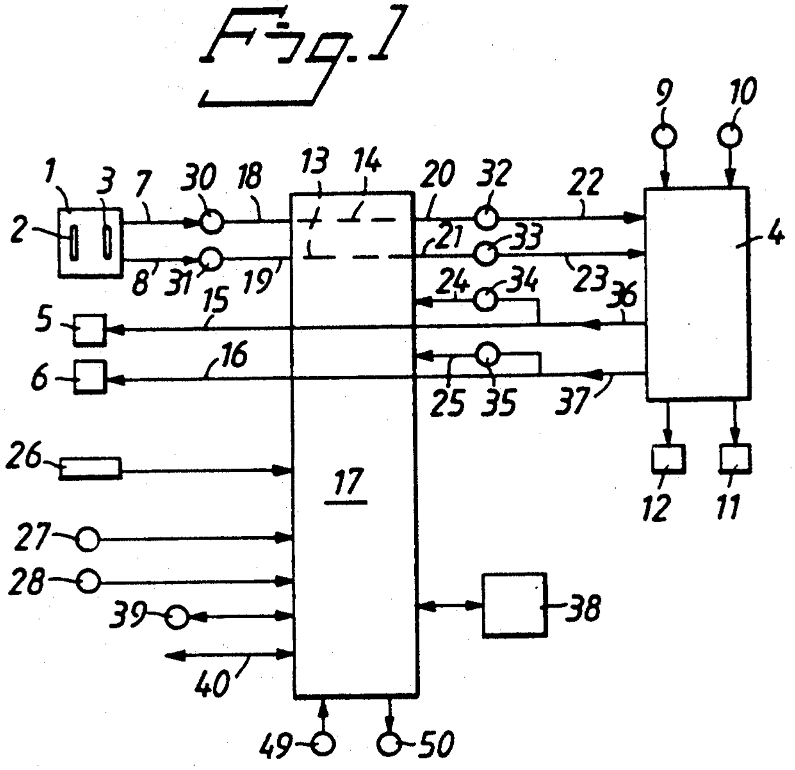

The present invention relates to an improvement in pay machines, by which is meant goods dispensers, parking ticket dispensing machines, etc., i.e. all machines which receive payment and deliver goods or carry out a service upon receipt of payment.

A common feature of such machines is that they all include one or more coin slots, a cancellation button, and often a button by means of which a specific item of goods is selected or by means of which the purchase of a specific item of goods is confirmed, subsequent to having inserted the correct sum of money.

In recent times, it has become more usual to effect payment through the medium of different credit cards and pay cards. However, a very large number of machines on the market today are solely coin operated machines. Parking meters or parking pay machines form a large group of such machines. One common type of parking meter issues a receipt or ticket subsequent to payment, which shows the expiry time of the parking ticket issued and which is intended to be placed in the vehicle in a position in which the ticket can be seen.

It would be extremely expensive to replace the electronics of a coin operated machine of this kind with new electronics which would also enable payment to be made by credit card.

This problem is solved by the present invention. The inventive arrangement is relatively inexpensive and is intended for installation in existing machines without removing existing electronics, thereby enabling the machine to accept payment in the form of coins and in the form of credit cards.

The present invention is not restricted to any particular kind of machine, although it is described below, by way of example, with reference to parking ticket dispensers.

Thus, the present invention relates to an arrangement in pay machines which include a coin or banknote verifier and a first computer unit which is intended to activate an intermediate cash till or like cash container which is intended either to guide coins or banknotes to a final cash till or to a coin or cash reject cup, where the coin or banknote is recovered, and which also activates the means operative to deliver the goods or the service for which payment has been made subsequent to payment having been verified and accepted. The invention is characterized in that the arrangement further includes a second computer unit which is connected between the coin or banknote verifier and the first computer unit; in that the second computer unit functions to sense the control signal or the like delivered by the first computer unit to means for controlling said intermediate cash till and final cash till; in that the second computer unit has connected thereto a credit card reader and one or more buttons which, when depressed, function to deliver a signal to the second computer unit corresponding to a given sum of money; and in that, subsequent to having made acceptable payment of a given sum by credit card and having pressed said button or buttons, the second computer unit functions to deliver to the first computer unit a signal which corresponds to the signal that is sent to the coin or banknote verifier when payment has been made by the insertion of one or more accepted coins.

Figure 2:
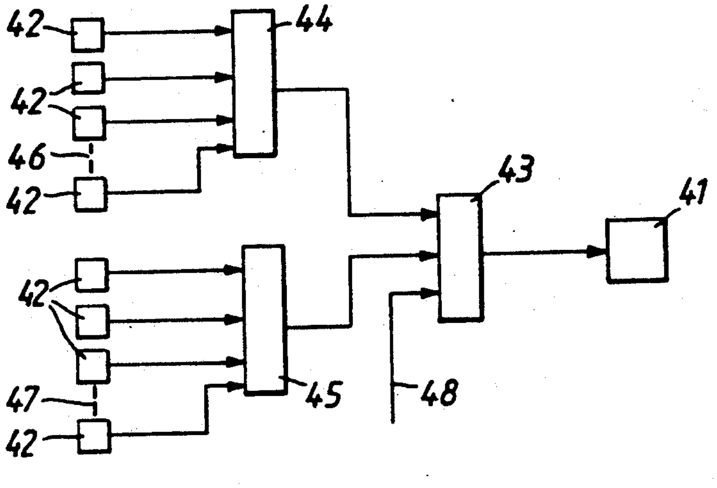

The invention will now be described in more detail with reference to an exemplifying embodiment thereof illustrated in the accompanying drawings, in which FIG. 1 is a block schematic illustrating the electronics of a car park pay machine incorporating the inventive arrangement; and FIG. 2 is a block schematic illustrating an information and reporting system.

FIG. 1 is a block schematic of the electronics of a car park pay machine which incorporates the present invention. It will be understood, however, that the block schematic can also be applied with automatic dispensing machines other than parking ticket pay machines.

One known pay machine of the present kind includes a coin verifier 1 and a first computer unit 4. The coin verifier 1 includes coin insertion slots 2, 3 and, although not shown, known sensing means which detects whether or not an inserted coin can be accepted as genuine. When the coin is accepted, the coin verifier functions to deliver an electric signal to the first computer unit 4. The machine may be provided with a banknote verifier instead of a coin verifier. The machine described below is provided with a coin verifier. It will be understood, however, that a machine fitted with a banknote verifier, e.g. in the form of an appropriate, known banknote reader, can be provided with the inventive arrangement in the same manner as a machine fitted with a coin verifier, as hereinafter described.

The first computer unit 4 is intended to activate an intermediate cash till or like cash receiving container which functions to guide coins to a final cash till, or to a reject coin cup from which the coin or coins can be recovered. The first computer unit also functions to activate means for delivering the goods or the service for which payment has been made and also to deliver any change that may be due, subsequent to payment having been accepted.

The intermediate cash till may be open or closed, which is controlled by means of a first pulling magnet. Similarly, the final cash till may be open or closed and is regulated or controlled by means of a second pulling magnet. The first and the second magnets respectively are energized through a respective first and a second relay 5 and 6, which in turn are activated by the first computer unit 4. When the machine is at rest, the intermediate cash till will normally be open and the final cash till closed. This prevents money from being "fished" from the final cash till. All unaccepted coins, or other objects, are passed from the intermediate cash till to the coin cup.

Such a machine will normally operate so that a first accepted coin activates the first computer unit and therewith close the intermediate cash till, with the coin remaining in said till. This is effected in response to a signal which is sent by the coin sensing device to the first computer unit 4, through a conductor 7, 8 and which signifies the type of coin inserted, wherewith the computer unit 4 delivers a control signal to the first relay 5 which, in response to said signal, activates the first pulling magnet to close the intermediate cash till.

Subsequent to having inserted the necessary number of coins, the person concerned can either alter his/her mind or confirm that he/she wishes to make payment.

If the person concerned should change his mind, he presses a cancellation button 9, whereupon the computer unit receives a signal which causes the computer unit to activate the first pulling magnet and therewith open the intermediate cash till, whereupon the coins fall down into the coin cup and can be recovered by the person concerned.

When the person concerned wishes to make payment, he presses a payment button 10, which causes the computer unit to activate the second pulling magnet and open the final cash till, so that the coins fall down thereinto.

A parking ticket pay machine is normally equipped with a display 11 which shows the amount that has been inserted and also the parking expiry time. This machine will also normally be equipped with a printer 12 which prints a parking ticket or parking receipt. Both the printer and the display are controlled by the computer unit 4.

The technique hitherto described with reference to FIG. 1 is known to the art and consequently the machine components will not be described in detail here.

Thus, in the case of a known parking ticket pay machine the conductors extend directly between the coin verifier 1 and the computer unit 4, as indicated by the chain lines 13, 14. Conductors 15, 16 also extend directly between the computer unit 4 and the relays 5, 6.

In accordance with the present invention, the pay machine also includes a second computer unit 17 which is connected between the coin verifier 1 and the first computer unit 4. Assume that the coin verifier is intended to deliver signals on the conductors 7, 8 relating to accepted a Swedish one crown coin and a five crown coin respectively. In this case, the conductors are each connected to a respective input 18, 19 on the second computer unit 17. Two outputs 20, 21 on the second computer unit 17 are also connected to the inputs 22, 23 on the first computer unit, which in a known parking pay machine is connected directly to the coin verifier 1.

The second computer unit 17 also functions to detect the control signal or like signal delivered by the first computer unit 4 to a device, namely said relays 5, 6 and associated pulling magnets, which functions to activate the aforesaid intermediate cash till and final cash till. To this end, it is preferred to detect the occurrence of voltage in the lines 15, 16 between the computer unit 4 and the relays 5, 6. This can be achieved with the aid of a voltage detector, such as a resistance connected in parallel with respective conductors 15, 16, said voltage detectors being connected to the inputs 24, 25 of the second computer unit.

Thus, in summary, the second computer unit is connected to the original circuit such as to be connected to the conductors 7, 8 between the coin verifier and the first computer unit 4 and also to detect the occurrence of voltage in the conductors 15, 16 extending between the first computer unit 4 and respective relays 5, 6. Thus, the conductors 15, 16 can be continuous, as illustrated in FIG. 1. However, the second computer unit may, instead, be connected so that the conductors 15, 16 are interrupted and extend to respective inputs and outputs on the second computer unit. In this case, the signals delivered by the first computer unit to the relays will pass via the second computer unit. In this latter embodiment, the second computer unit 17 forms the aforesaid voltage detecting device.

The second computer unit 17 is constructed so that when in an inactive state the signals pass from the coin verifier to the first computer unit, as though the second computer unit 17 was not found.

A credit card reader 26 of an appropriate, known kind is connected to the second computer unit 17. The card reader delivers to the second computer unit information relating to card number, the account number to which the credit card applies, and possibly also the credit limit, etc. The arrangement also includes one or more buttons 27, 28 which, when depressed, deliver to the second computer unit a signal which corresponds to a given sum of money. For instance, the signal delivered when depressing one of the buttons 27 will indicate insertion of a one crown coin, whereas the signal resulting from depression of the other button 28 will indicate the insertion of a five crown coin.

Subsequent to effecting accepted payment of a given sum through the medium of a credit card and consequent depression of said button or buttons 27, 28, the second computer unit 17 will deliver to the first computer unit 4 a signal which corresponds to the signal that is delivered by the coin verifier 1 upon receipt of the aforesaid sum in the form of one or more accepted coins. This is effected through a signal produced on one or both of the outputs 20, 21 of the second computer unit 17.

As beforedescribed, when payment is made with coins, the second computer unit remains inactive. However, statistics have shown that an advantage is afforded when the second computer unit 17 is constructed to detect and register a signal produced by the coin verifier and also to register activation of the relays 5, 6 by the first computer unit.

When payment is made by credit card, the card is sensed by the credit card reader 26 and, provided that the card is valid, the second computer unit 17 activates sensing of the buttons 27 and 28. Each time one of the buttons 27, 28 is depressed, the second computer unit 17 will send a signal to the inputs 22, 23 of the first computer unit, these signals being the same as those signals that are delivered by the coin verifier when said verifier has detected an accepted, inserted coin. Subsequent to insertion of the desired sum through the buttons 27, 28, the person concerned either depresses the cancellation button 9 or the payment button 10.

When the person concerned presses the cancellation button, the sum is set to zero in the first computer unit 4 at the same time as said unit activates the relay 5 so as to open the intermediate cash till. In this case, however, no coins are found in the till. When the first computer unit activates the relay 5, this activation is detected by the second computer unit via the input 24, wherewith the payment is set to zero in the second computer unit.

If the person concerned presses the payment button, the first computer unit will activate the relay 6, therewith opening the final cash till. The first computer unit may also activate the printer, so as to print a ticket or receipt. This is detected by the second computer unit, via the input 25, and the payment is recorded so that the credit card account can be debited accordingly.

As will be evident from the aforegoing, activation of the second computer unit solely results in the delivery of signals to the first computer unit which simulate payment effected by coins, although in actual fact payment has been effected by credit card.

This use of the first computer unit enables the second computer unit to be of simple and inexepensive construction.

According to one preferred embodiment of the invention, optoswitches 30–33 are arranged between the coin verifier 1 and the second computer unit 17 and between the second computer unit 17 and the first computer unit 4, therewith separating the second computer unit galvanically from the coin verifier and the first computer unit.

In accordance with a second preferred embodiment of the invention, optoswitches 34, 35 are connected electrically in parallel with respective outputs 36, 37 from the first computer unit 4 to said devices 5, 6 which function to control the intermediate cash till and the final cash till respectively, wherein the outputs of respective optoswitches are connected to the second computer unit 17.

These two preferred embodiments enable the second computer unit 17 to be installed so that it is totally separated galvanically from the original installation, such that the original installation cannot be influenced and therewith eliminating disturbances caused by the modification with the second computer unit.

According to another preferred embodiment of the invention, there is connected to the second computer unit 17 a memory store 38 in which transactions made with credit cards are stored. The memory is arranged to be emptied to an external computer.

The arrangement also includes a memory, either the same memory as the lastmentioned memory 38 or a separate memory, which is connected to the second computer unit 17 and which functions to receive credit card invalidity lists from an external computer. Thus, when a credit card is read by the credit card reader, the second computer unit 17 is operative to compare relative data with the invalidity list and to render impossible insertion of a payment sum should the credit card presented be invalid.

Emptying of information stored in a memory and relating to transactions carried out, and also the infeed of invalidity lists, can be effected through an input and output 39 of a portable external computer, or alternatively through an external computer telecommunication line 40.

It is preferred to connect the second computer unit 17 to a central computer 41 for credit card transactions via a telecommunication line 40, as illustrated in FIG. 2. This computer will contain information relating to invalidity lists and is programmed to register and to carry out necessary money transactions.

With regard to vehicle parking machines in particular, which are normally found in groups in relatively large numbers, an advantage is afforded when several machines are connected to one and the same telecommunication line.

Consequently, according to one preferred embodiment, the second computer unit 17 of two or more machines 42 is connected to said central computer through a multiplex circuit 43, or through several multiplex circuits 44, 43 and 45, 43 respectively connected sequentially in series. The dash lines 46, 47 indicate that more than four machines can be connected to the same multiplex circuit 44; 45. The line 48 indicates that several of the multiplex circuits 44, 45 located nearest the machines can be connected to the next multiplex circuit 43 located in the series of multiplex circuits.

It will be obvious that the second computer unit 17 obtains information relating to each payment when said computer unit is also arranged to detect and register payment made with coins. In this case, the second computer unit may be programmed to send a signal to a central computer such as to inform the computer when the machine shall be emptied, to disclose how much money is found stored in the final cash till, to inform that an exchange of printer paper is needed, and similar information.

Furthermore, there may be connected to the second computer unit an alarm sensor 49 which functions to produce an alarm signal should an attempt be made to force open the machine, for instance. This sensor may be of any known, suitable kind. The computer unit 17 is programmed to produce an alarm signal in response to a signal delivered by the alarm sensor. When the machine is connected to a central computer through a telecommunication line, the computer unit 17 will preferably send an alarm signal to the central computer, which transmits the signal further to an alarm centre or the like. In addition, the computer unit 17 is programmed to activate an acoustic and/or light signal 50 on the machine, so as to summon the attention of the surroundings, particularly when the machine is not connected to a central computer.

The invention has been described in the aforegoing with reference to parking pay machines. It will be obvious, however, that because the majority of coin pay machines have roughly the same construction with regard to the payment devices used, the present invention can be applied with many different automatic pay machines intended for different purposes. It will also be obvious that modifications can be made in ways evident to the skilled person within the scope of the present invention. For instance, activation of the relays by the first computer unit can be effected in some other way.

The invention shall not therefore be considered restricted to the aforedescribed exemplifying embodiments, since modifications can be made within the scope of the following claims.

We claim:

1. An arrangement in pay machines of the kind which include a received money verifier, a first computer unit which functions to activate an intermediate cash till which receives money from said received money verifier, said intermediate cash till being adapted to guide received money to a final cash storage means, and which said first computer unit also functions, subsequent to received money payment having been verified and accepted, to activate devices for delivering that for which payment has been made, said arrangement further comprising a supplemental second computer unit (17) which is connected between the money verifier (1) and the first computer unit (4); said second computer unit being adapted to simulate payment as being effected by money when payment, in fact, has been effected by a credit card; and wherein said second supplemental computer unit (17) is adapted to detect a control signal delivered by said first computer unit (4) to a device (5, 6) which is adapted to function to control said intermediate cash till and said final cash storage means; a credit card reader and input button means connected to said supplemental second computer unit (17) and said input button means being adapted, when activated, to deliver to the supplemental second computer unit (17) a signal which corresponds to a given sum of money; and, when payment is made by credit card and said input button means (27, 28) are activated and payment of a given sum has been accepted, said supplemental second computer unit (17) simulates and will deliver to the first computer unit (4) a signal which corresponds to receipt by the money verifier (1) of one or more accepted pieces of money constituting said given sum.

2. An arrangement according to claim 1, wherein optoswitches (30–33) are arranged between the money verifier (1) and the supplemental second computer unit (17) and between the supplemental second computer unit (17) and said first computer unit (4), therewith galvanically separating the supplemental second computer unit from the money verifier and from the first computer unit.

3. An arrangement according to claim 1, wherein output circuits (36, 37) are provided from the first computer unit (4) to said device (5, 6) for respectively controlling the intermediate cash till and the final cash storage means, and an optoswitch (34, 35) is connected in parallel with each said output circuit and wherein the output (24; 25) of each said optoswitch is connected to the supplemental second computer unit (17).

4. An arrangement according to claim 1, wherein a memory unit is connected to the supplemental second computer unit (17) and said memory unit is adapted to store credit card transactions, and means are provided to enable the contents of said memory unit to be transferred to an external computer (41).

5. An arrangement according to claim 1, wherein a memory unit is connected to the supplemental second computer unit (17) and said memory unit is adapted to receive credit card invalidity lists from an external computer (41).

6. An arrangement according to claim 1, wherein said supplemental second computer unit (17) includes means enabling connection to a central computer (41) for credit card transactions, via a telecommunication line (40).

7. An arrangement according to claim 6, comprising a plurality of said supplemental second computer units (17), respectively of at least two pay machines (42) are connected to said central computer (41) through at least one multiplex circuit (43).

8. An arrangement according to claim 7 wherein said at least one multiplex circuit (43) comprises a plurality of multiplex circuits (44, 43; 45, 43) connected sequentially in series.

* * * * *